(No Model.)
I. N. DAVIS & G. TWEEDY.
COMBINED COOKING STOVE AND GRATE.
No. 404,177. Patented May 28, 1889.
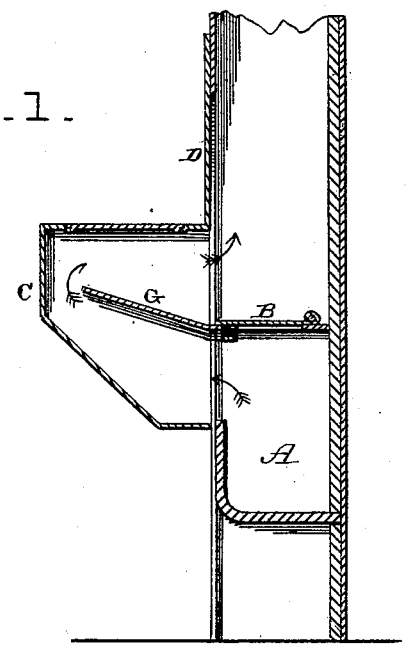
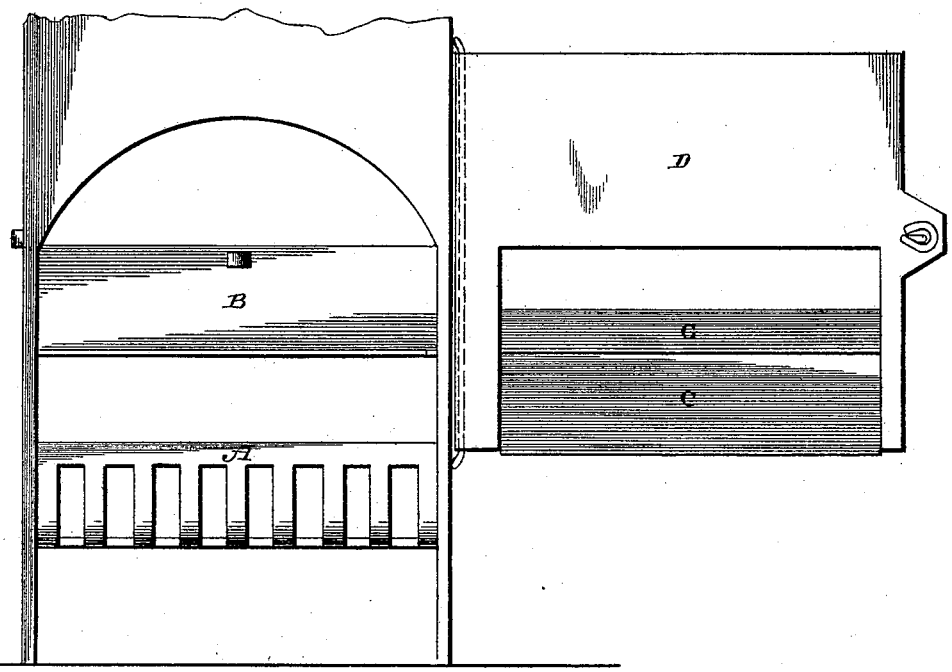
Witnesses:
E. P. Ellis,
L. L. Burket.
Inventors
Isaac N. Davis,
Geo. Tweedy,
per F. A. Lehmann,
Atty

UNITED STATES PATENT OFFICE.

ISAAC N. DAVIS AND GEORGE TWEEDY, OF WEST ELIZABETH, PENNSYLVANIA.

COMBINED COOKING-STOVE AND GRATE.

SPECIFICATION forming part of Letters Patent No. 404,177, dated May 28, 1889.

Application filed March 8, 1889. Serial No. 302,408. (No model.)

*To all whom it may concern:*

Be it known that we, ISAAC N. DAVIS and GEORGE TWEEDY, of West Elizabeth, in the county of Allegheny and State of Pennsylvania, have invented certain new and useful Improvements in Combined Cooking-Stoves and Grates; and we do hereby declare the following to be a full, clear, and exact description of the invention, such as will enable others skilled in the art to which it pertains to make and use it, reference being had to the accompanying drawings, which form part of this specification.

Our invention relates to an improvement in a combined cooking-stove and grate; and it consists in the combination of an ordinary grate, a damper placed above it, and a hinged casing provided with a division-plate, the edges of the damper when closed and the division-plate when the casing is closed over the front of the grate being made to meet, as will be more fully described hereinafter.

The object of our invention is to provide a casing which can be used in connection with an ordinary grate, and through which all the products of combustion can be made to pass, so that the fire in the grate can be used for either heating or cooking purposes.

Figure 1 is a vertical section of the casing and grate, the casing being shown in position ready for use. Fig. 2 is a front view showing the casing turned back, leaving the grate entirely clear.

A represents an ordinary grate, which is provided with a pivoted flat damper, B. This damper is made to drop from a vertical into a horizontal position, as shown, so as to prevent the products of combustion from rising directly up the chimney and thus force them outward through the casing. When the grate alone is used, this damper is turned up into a vertical position, as shown in Fig. 2; but when the stove is brought into use the damper is turned down so as to force the products of combustion outward through the casing. The cooking-stove C is hinged or pivoted at one edge of the chimney, as shown, so as to be freely swung through one-half of a circle, and either moved back so as to leave the grate entirely clear or else closed across the front of the grate, as shown in Fig. 1. This casing consists of the plate D, which extends up along the chimney sufficiently far to entirely close the front of the grate, and through which is made a suitable opening. The casing is secured to this plate, and may either be of the form here shown or any other that may be preferred. Inside of this casing is placed a division-plate, G, which, when closed, makes a tight joint with the outer edge of the damper, so that the products of combustion cannot escape up between them, but will be forced outward through the casing under this division-plate, up against the under side of the top of the casing, and then up the chimney, as shown by arrows. When the damper is lowered and the casing is swung around into the position shown in Fig. 1, all the direct draft up the chimney at once ceases and then the products of combustion pass through the casing for the purpose of cooking anything placed thereon. This casing may also be used for heating purposes, if so desired, because by the passage of the products of combustion through the casing a very large heating-surface is produced.

As the casing may either be swung back out of the way or be lifted entirely off its hinges, it will be readily seen that either the grate or casing may be used as may be desired. While the stove is in the position shown in Fig. 1, it may be held by a spring catch or latch of any kind.

Having thus described our invention, we claim—

The combination of the grate A and the pivoted damper B above it with the pivoted casing C, provided with the stationary division-plate G and the vertical plate D, which closes the opening above the damper, the edge of the damper when closed being made to meet the edge of the division-plate when the casing is closed over the front of the grate, substantially as shown.

In testimony whereof we affix our signatures in presence of two witnesses.

ISAAC N. DAVIS.
    GEORGE TWEEDY.

Witnesses:
 S. H. DALLY,
 W. E. PERCIVAL.